United States Patent [19]
Gat

[11] Patent Number: 5,469,432
[45] Date of Patent: Nov. 21, 1995

[54] HIGH-SPEED DIGITAL COMMUNICATIONS NETWORK

[76] Inventor: Erann Gat, 2983 Margaret Dr., Pasadena, Calif. 91107

[21] Appl. No.: 111,975

[22] Filed: Aug. 26, 1993

[51] Int. Cl.[6] .................................................. H04L 12/46
[52] U.S. Cl. .......................... 370/60; 370/85.14; 370/94.3; 370/108
[58] Field of Search .......................... 370/60, 85.9, 85.13, 370/85.14, 94.1, 108, 94.3, 60.1, 94.2

[56] References Cited

U.S. PATENT DOCUMENTS

| | | | |
|---|---|---|---|
| 4,744,078 | 5/1988 | Kowalczyk | 370/85.9 |
| 4,947,388 | 8/1990 | Kuwahara et al. | 370/60 |
| 5,016,248 | 5/1991 | Kudoh | 370/94.1 |
| 5,020,020 | 5/1991 | Pomfret et al. | 364/900 |
| 5,038,347 | 8/1991 | Courtis | 370/85.9 |
| 5,046,065 | 9/1991 | Göertz | 370/85.9 |
| 5,090,029 | 2/1992 | Yamamoto et al. | 375/107 |
| 5,099,475 | 3/1992 | Kozaki et al. | 370/60 |
| 5,103,447 | 4/1992 | Takiyasu et al. | 370/85.15 |
| 5,113,392 | 5/1992 | Takiyasu et al. | 370/85.15 |
| 5,184,346 | 2/1993 | Kozaki et al. | 370/60 |
| 5,187,780 | 2/1993 | Clark et al. | 395/325 |
| 5,224,096 | 6/1993 | Onishi et al. | 370/85.14 |
| 5,241,682 | 8/1993 | Bryant et al. | 370/85.14 |

*Primary Examiner*—Benedict V. Safourek
*Attorney, Agent, or Firm*—Marvin H. Kleinberg; Marshall A. Lerner; Michael J. Ram

[57] ABSTRACT

A digital communications network for digital data comprising packets of a predetermined size. A transmitter and a receiver are connected to a set of buffers which are connected to a microprocessor which controls the data flow into and out of the buffers. The size of the buffers and hence the size of the data packets is relatively large. This allows the processor to perform per-packet operations in software which would otherwise be done in hardware, including routing decisions and error detection and correction. The network allows various topologies, is speed scalable, and simplifies resource allocation.

21 Claims, 4 Drawing Sheets

HIGH-SPEED DIGITAL COMMUNICATIONS NETWORK

BACKGROUND

Providing high-speed communication is increasingly valuable.

This invention relates to digital communications networks.

Digital communications networks consist of two or more installations of digital communications hardware connected together by some form of transmission medium. Some common transmission media are coaxial cable, fiber optics, phone lines, and radio.

Each installation connected to the network is known as a node. Communications consist of the transfer of digital data from one node to another. Usually, the communications hardware at a node is installed in a general purpose computer referred to as the host.

In order to separate actual data from control information related to routing and error detection, data in digital communications networks are organized as packets. A packet is a collection of data together with its associated control information, contained in a separate portion of the packet known as the packet header. A network design may require that all packets be of a fixed size, or may allow packets to take on a range of different sizes. In the latter case, the size of the packet must somehow be specified in the packet's control information, either by explicitly listing the size of the packet, or by including a unique data pattern to signal the end of a packet.

It is possible to design a network in which every node in the network is connected to every other node. Such networks are called fully connected networks. Because the number of connections in such a network rises as the square of the number of nodes, the cost of such a network is prohibitive, especially when the number of nodes is large. Fully connected networks are therefore almost never used.

Instead, networks are almost always partially connected. In order to communicate between two arbitrary nodes, data must often pass one or more intermediate nodes on its way to the destination. Destinations are designated by assigning to each node a unique node address, usually a number, which distinguishes that node from every other node in the network.

Packets must contain information related to their intended destinations in order to permit them to be properly routed through the network. Each packet may contain within it enough information to determine the packet's destination unambiguously.

An alternative routing method is to use a connection-oriented network protocol. In such a protocol, before any data can be transmitted from one node to another, a connection must be established between the two. Connections are established by transmitting special control packets between the two nodes. This connection is assigned a unique connection identifier, which is contained in the header of subsequent packets to be communicated between the two nodes. The connection identifier must be remembered by all intermediate nodes for the duration of the connection. Connection-based protocols allow packet headers to be smaller, but require complex procedures to recover from failures of intermediate nodes.

The list of connections between nodes is known as the topology of the network. The most common topologies are loops, stars, and bus or broadcast networks. In a loop topology, each node is connected to exactly two others. In a star network, every node has a single connection to a common central node. In a broadcast network, every node is connected to every other node through a single common connection or bus.

Broadcast networks have a unique difficulty associated with them. Because multiple transmitters are connected to the same transmitting medium, it is possible that more than one transmitter will attempt to transmit simultaneously. Such a condition is known as a collision. All broadcast networks must have mechanisms to detect and recover from collisions.

Loop-type networks commonly use a resource allocation method known as a token protocol in which a privileged data packet known as a token is circulated around the network. Only the node which currently possesses the token is allowed to transmit data. Complex procedures are necessary to keep the token circulating around the network, and to recover in the case where the token is lost due to a transmission error. This results in design complexity and inefficient use of network resources.

When connecting a very large number of nodes in a network it is common practice to separate the nodes into two or more separate groups. The nodes in each group are connected in the usual way. Each group thus connected is known as a subnetwork or subnet. Subnets are then connected to each other by means of a device called a subnetwork bridge or simply a bridge.

Bridges can be quite sophisticated in their design. For example, a bridge may discriminate between data packets whose routing requires crossing a subnet boundary and packets which do not, and transfer only those packets which require crossing the boundary. A bridge may even improve its performance over time by observing patterns of traffic across the subnet boundary and adjusting its actions accordingly.

The properties of state-of-the-art networks are fixed in their hardware designs. Thus, the only way to change a property of the network is to change the hardware. In addition, most networks implement some form of error detection and correction in hardware. Many networks implement routing in hardware. The design of such networks is brittle and very difficult and expensive to modify.

All the nodes of a digital communications network must adhere to some convention concerning the speed at which data is transmitted. Some network designs mandate a fixed clock rate. Networks which allow the rate of data transmission to be easily changed are called speed-scalable networks.

There is a need to provide a high-speed communication system which is usable in relation to many network topologies, and which is highly flexible in its operative characteristics.

SUMMARY

The present invention seeks to provide such a high speed, low cost, highly flexible communication system.

The present invention is a design for a speed-scalable digital communications network employing data packets of fixed predetermined size. A central unique feature of the design is that most of the functionality of the network is implemented in software rather than hardware. The hardware can thus be very inexpensive and reliable while offering superior performance.

A key idea of the invention is to have dedicated computational facilities (i.e. a control microprocessor) at every node in the network. A further key idea of the invention is to use data packets of uniform size, which size is chosen to provide a balance between the speed of the network and the computational power available at each node. In other words, the size chosen for the data packets must be large enough that the time required to transmit a packet is sufficient for a microprocessor to perform a variety of operations on the packet.

The hardware consists of a set of nodes connected to each other by a transmission medium. Each node consists of:

an array of data buffers of uniform size, namely the size of a data packet, a transmitter, a receiver, and a microprocessor.

Because each node contains a microprocessor, it is a fully functional computer and is thus capable of useful behavior of its own. However, a node is more typically used by interfacing it to another computer or other digital data processing device. Such a device is called a host, and the interface between the microprocessor and the host is called the host interface.

Each transmitter is connected to a receiver. The topology of interconnections is flexible, but loop and star topologies are typical. The topology may even be mixed. The hardware permits efficient transfer of the contents of a data buffer from one node to a connected node. This basic functionality is extended to provide the full functionality of a communications network by programming the microprocessor at each node in a particular way. The behavior of the network is thus determined by this programming. Because most features are implemented in software, the characteristics of the network can be modified by simply changing the software. The design is uniquely flexible. New classes of network architectures can be implemented without modifying the hardware.

The data packet, in accordance with standard practice in the art, consists of a header and a payload. The payload contains the actual data to be communicated. The header contains information about how the packet is to be routed. This routing information may explicitly list the source and destination addresses, or may contain a connection identifier, depending on whether or not a connection-oriented protocol is in use. The header may also contain additional information such as error detection and correction information, or information about the format of the data in the payload. Although the size of the entire packet is fixed, the relative portions of the packet which comprise the header and the payload may vary.

In one preferred form of the invention, the network service which may be provided in software is packet forwarding. Upon receiving a data packet, the control microprocessor examines the packet header to see if the address of the packet's destination is the same as the receiving node's address. If it is not, the node transmits the packet as received to the next node in the network. In this way, the packet will eventually arrive at its destination.

By way of a further preferred form of the invention, this functionality may be enhanced by adding a counter field to the packet header. At each retransmission, this counter is decremented by 1. When the value of the counter is 0, the packet is no longer forwarded. This prevents packets with invalid destination addresses from circulating in the network forever. This enhanced functionality is achieved by changing the software.

Error checking on all or part of the packet may also be added by modifying the software of a node's control microprocessor. The existence of the ability to perform error checking in software must not be construed to preclude the possibility of performing error-checking in hardware.

The ability to handle many different protocols on the same network may be added by adding a protocol identification field to the packet header. This field, probably the first byte in the packet, contains a code number which defines the format of the rest of the packet. By examining the value of this identification field, the control microprocessor may handle different packets in different ways. The ability to handle new protocols can be added by changing the software.

Modifications to the design of the hardware allow other useful functionalities to be obtained such as subnetwork bridges and higher-speed data transmission.

The invention consists of hardware and software operating as an integrated whole. The hardware is specifically designed to support the software, while the software imbues the system with most of its functionality.

The invention consists of the apparatus, parts, components, constructions, arrangements, combinations, methods, and steps for facilitating the high speed flexible communication system.

The invention is further set out with reference to the accompanying drawings.

DRAWINGS

DESCRIPTION

Basic Node

The terms "buffer", "memory buffer" and "data buffer" as used in this application mean a logical unit of memory of sufficient size to contain a particular unit of data. The extent of a buffer is independent of the hardware used to implement that buffer. A single buffer may be a single component, or it may be multiple components, or it may be a portion of one component.

Figure 1:
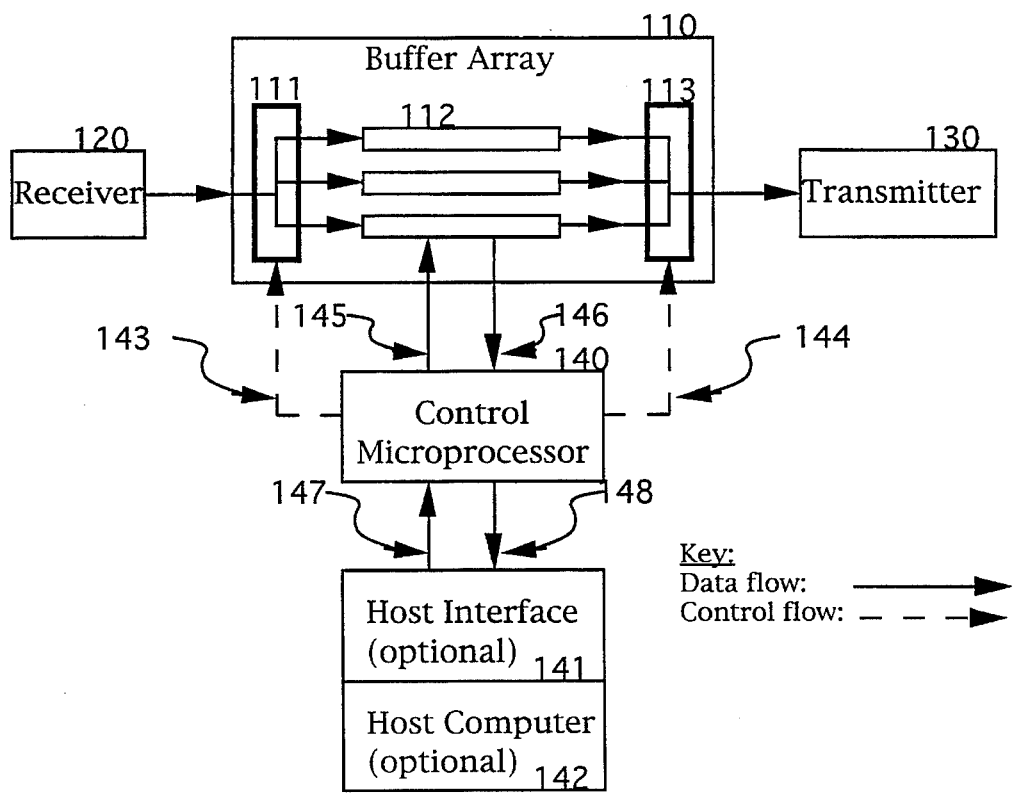
FIG. 1 shows a schematic block diagram of a single node of the present invention.

Referring to the drawings, a basic node of the present invention is shown in FIG. 1. Buffer means, namely, a buffer array 110 is connected to and controlled by a control microprocessor 140. The buffer array consists of a plurality of rows of random access memory buffers 112. Each buffer, namely each member of the plurality of random access memory buffers is of a uniform size, the size being at least the size sufficient to receive a predetermined size of packet, preferably a fixed size packet employed by the network. These buffers 112 can be accessed by the microprocessor 140 in exactly the same manner as ordinary random access memory. In addition, each row of buffers 112 can act as a shift register which can be accessed through a pair of serial ports, a serial input port 111 and a serial output port 113.

The serial ports 111 and 113 allow the contents of a selected buffer 112 to be read or written in serial bit-wise fashion without any intervention by the microprocessor except to initiate the operation. The serial input port 111 contains a demultiplexer which is controlled by the microprocessor 140 to select the particular buffer 112 which is to be written by incoming serial data. The serial output port 113 contains a multiplexer which is controlled by the microprocessor 140 to select the particular buffer 112 which is to be read to provide the outgoing serial data. These respective control lines between the microprocessor 140 and ports 111 and 113 are illustrated as 143 and 144.

One possible implementation of the buffer array 112 uses a common integrated circuit known as a triple-ported video random-access memory (RAM). Triple-ported video RAM's are commonly used in digital video equipment where they are used to produce various special effects. A triple-ported video RAM is a standard computer memory chip with a pair of serial interfaces attached which allow rows 112 of memory to be read or written as monolithic operations. By using triple-ported video RAM to implement the buffer array, a node can be implemented inexpensively.

The control microprocessor 140 is optionally connected to a host computer 142 via a host interface 141 allowing data to be transferred between the host computer 142 and the buffer array 110. Data is transferred between the buffer array 110 and the control microprocessor 140 along lines 145 and 146; data between microprocessor 140 and host 141 is transferred along lines 147 and 148.

The serial input port 111 is connected to a receiver 120, and the serial output port 113 is connected to a transmitter 130. The receiver 120 and transmitter 130 connect the buffer array serial ports 111 and 113 to a transmitting medium 210 (FIG. 2), and perform some standard functions such as data encoding and clock synchronization. Data is transmitted along lines 150 between input port 111 and buffer array 110, and lines 151 between buffer array 112 and output port 113. Data from receiver 120 flows along line 152 to the input port 111, and from the output port 113 along line 153 to the transmitter 130.

Transmitting Between Nodes

Figure 2:
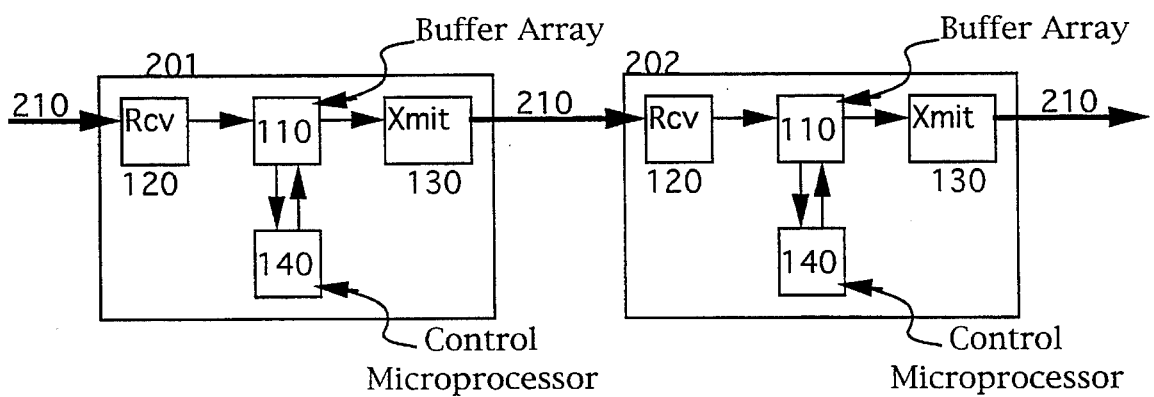
FIG. 2 shows the manner of interconnection of a pair of nodes through a communications medium.

Individual nodes constructed according to the present invention are connected together as illustrated in FIG. 2. A transmitter of a transmitting node 201 is connected to the receiver of a receiving node 202 via a transmission medium 210. In general, every node in the network will be both a transmitting node and a receiving node. Which designation is appropriate depends upon the contexts of the reference.

Data in the form of packets is transferred from a transmitting node to a receiving node in the following manner: the control microprocessor of the transmitting node causes data from a row of buffer 112 on the transmitting node to be output through the serial output port 113 of the transmitting node to the transmitter 130 of the transmitting node. The transmitter 130 of the transmitting node is connected to the receiver 120 of the receiving node via the transmission medium 210. The transmitted data will be received by the receiver 120 of the receiving node and be sent via the serial input port 111 of the receiving node into a row of buffer 112 of the receiving node's buffer array 110. Synchronization is achieved automatically by the transmitter 130 and receiver 120 using standard methods. The transfer of data from node to node in this manner comprises a packet. Packets are thus of a predetermined size, preferably a fixed size, to wit: the size of a buffer of the buffer array.

The performance of the system depends upon the size chosen for a data packet. It is advantageous if the size is relatively large. It is further advantageous if the size is a power of 2. This is because the control microprocessor, being a digital computer which operates on binary data, is naturally structured to operate on data structures whose size is a power of 2. Choosing a buffer size which is a power of 2 can therefore result in simplified software. A typical size of a data packet is 2048 bytes, although it may be any size.

The size of the packet must be large enough so that the time required to transmit a packet is sufficient to allow the processor 140 to perform several necessary services which are normally performed using specialized hardware, most notably packet routing. These and other operations will be described in later sections.

Subnetwork Bridges

There are many variations on the basic design. A subnetwork bridge is pictured in FIG. 3. In this variation, a single control microprocessor 340 controls more than one buffer array 310 and associated transmitter/receiver pairs 330/320. The buffer arrays are connected to the transmitters through a crossbar switch 301, which is also under the control of the control microprocessor 340. This design can receive data simultaneously from multiple nodes, and can also transmit data simultaneously to multiple nodes. Furthermore, the control microprocessor 340 can control the routing of incoming and outgoing data channels by controlling the crossbar switch. Because all data packets are the same size, reconfiguration of the crossbar switch can occur synchronously, that is, all changes in configuration can occur at the same time, in between packet transmissions.

Incoming packets will not necessarily be received in synchrony. The buffer arrays allow incoming packets to be stored until a complete packet has been received on each channel. All packets can then be retransmitted simultaneously.

The design of the subnetwork bridge is not limited to two sets of transmitters, receivers, and buffer arrays, but may include an arbitrary number of said components. Such an extended subnetwork bridge can be used as the central node of a star network.

Speed Scalability

The network is speed scalable. This means that the same basic design is applicable to networks operating at a variety of different clock rates. Higher speeds may be achieved by selecting faster components for the buffers, transmitters, receivers, and control microprocessors, as well as by organizing the buffer arrays to have larger word sizes.

Figure 3:
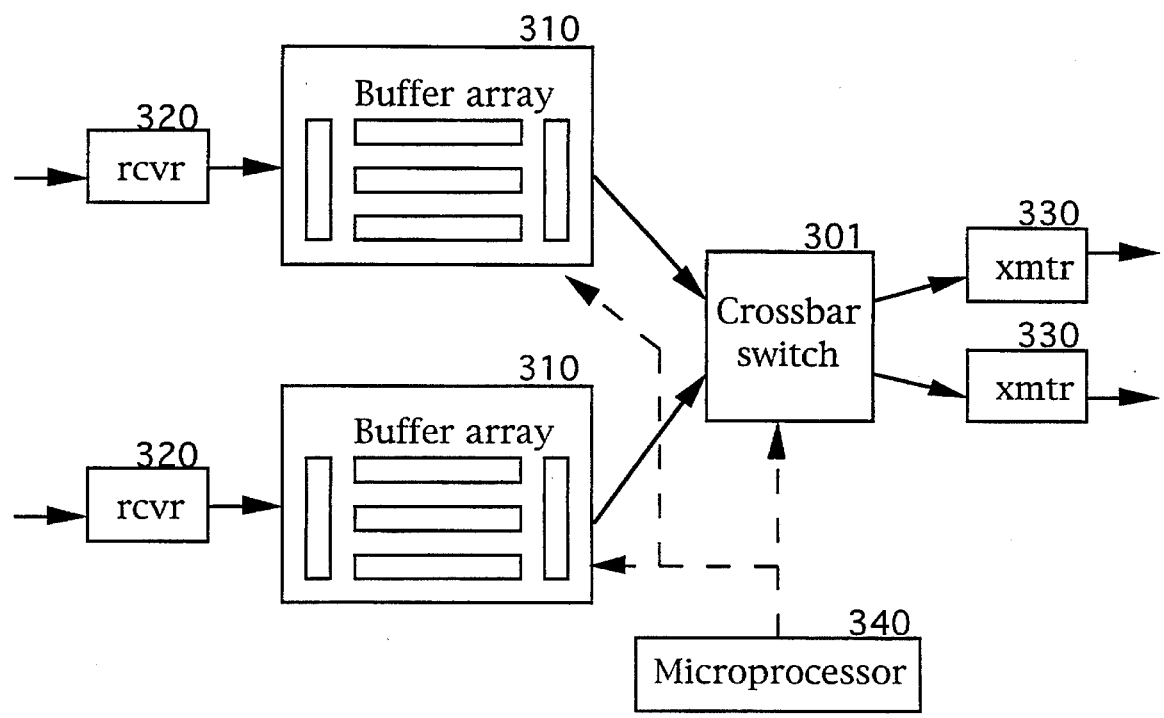
FIG. 3 shows a variation on the basic design, namely, a subnetwork bridge.

Subnetworks constructed according to the present invention but operating at different clock rates may even be connected together by using the subnetwork bridge of FIG. 3. This is possible because the packet size is fixed, and is the same regardless of the speed at which they are transmitted and received. Thus, interconnecting subnetworks operating at different speeds is a matter of "time distortion". The speed at which the bits are actually transmitted is transparent to the control microprocessor, which sees only whole packets.

The data transmission rate between nodes could even be changed on-the-fly to compensate for different conditions in the transmitting medium. This could be useful, for example, when a wireless transmitting medium is used, and the useable bandwidth can vary due to various circumstances such as weather conditions.

Network Topology

Nodes can be combined to form networks with versatile topologies. One example of a network constructed according to the present invention is shown schematically in FIG. 4. It is to be understood that this diagram is by way of illustration only, and is no way restrictive or prescriptive.

Figure 4:
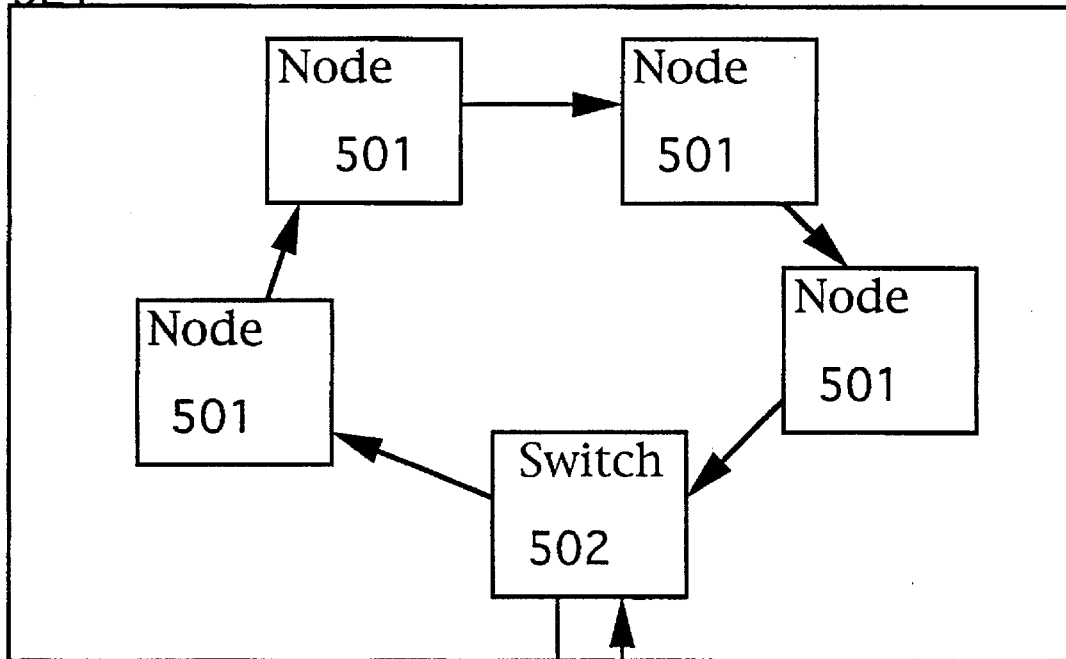
FIG. 4 shows a configuration of a digital communications network implemented using the present invention.
Figure 4:
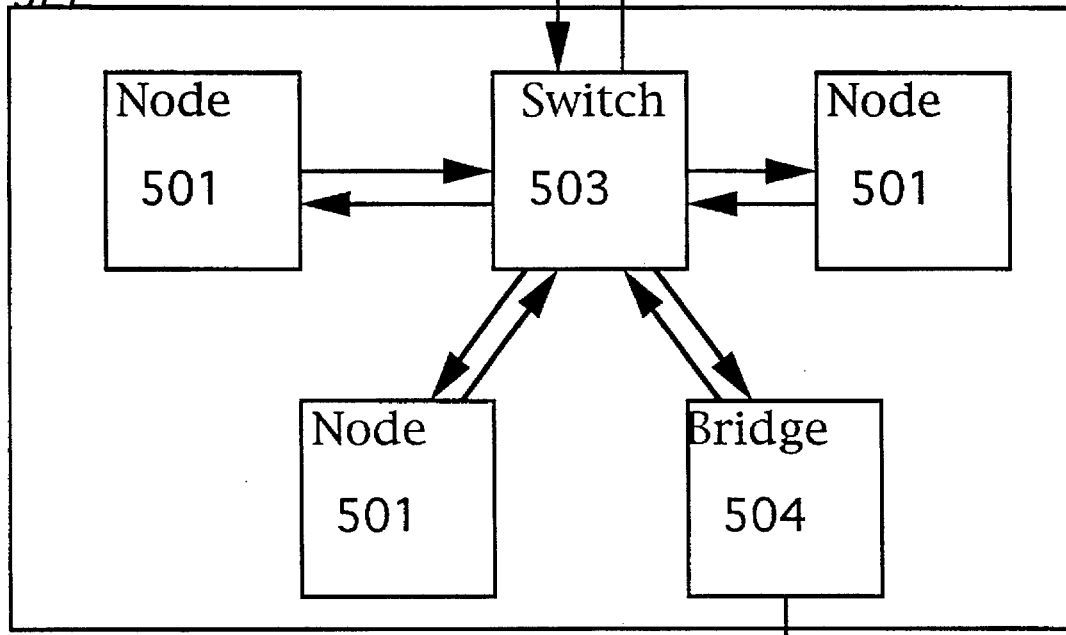
Figure 4:
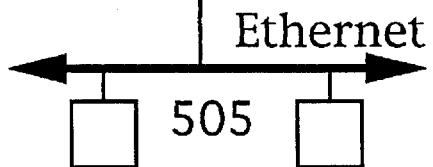

In FIG. 4, a network is depicted consisting of two subnetworks, 521 and 522. Subnetwork 521 is configured as a ring consisting of a number of basic nodes 501 and a subnetwork bridge 502. Subnetwork 522 is configured as a star consisting of a number of basic nodes 501 and a star controller 503 constructed as a straightforward extension of the subnetwork bridge design.

FIG. 4 further shows a special node 504 which acts as bridge between the network according to the present invention to some other sort of network 505. In this case, the network pictured is a bus-type network such as an Ethernet.

Network Operation

Most of the functionality of the network arises from the programming of the control microprocessor, 140, 340 and 440 as illustrated. There are infinite variations on this programming, but implementations share some core features in common. In particular, a node receives packets destined for that node, forward packets destined for some other node, and originates data packets.

Figure 5:
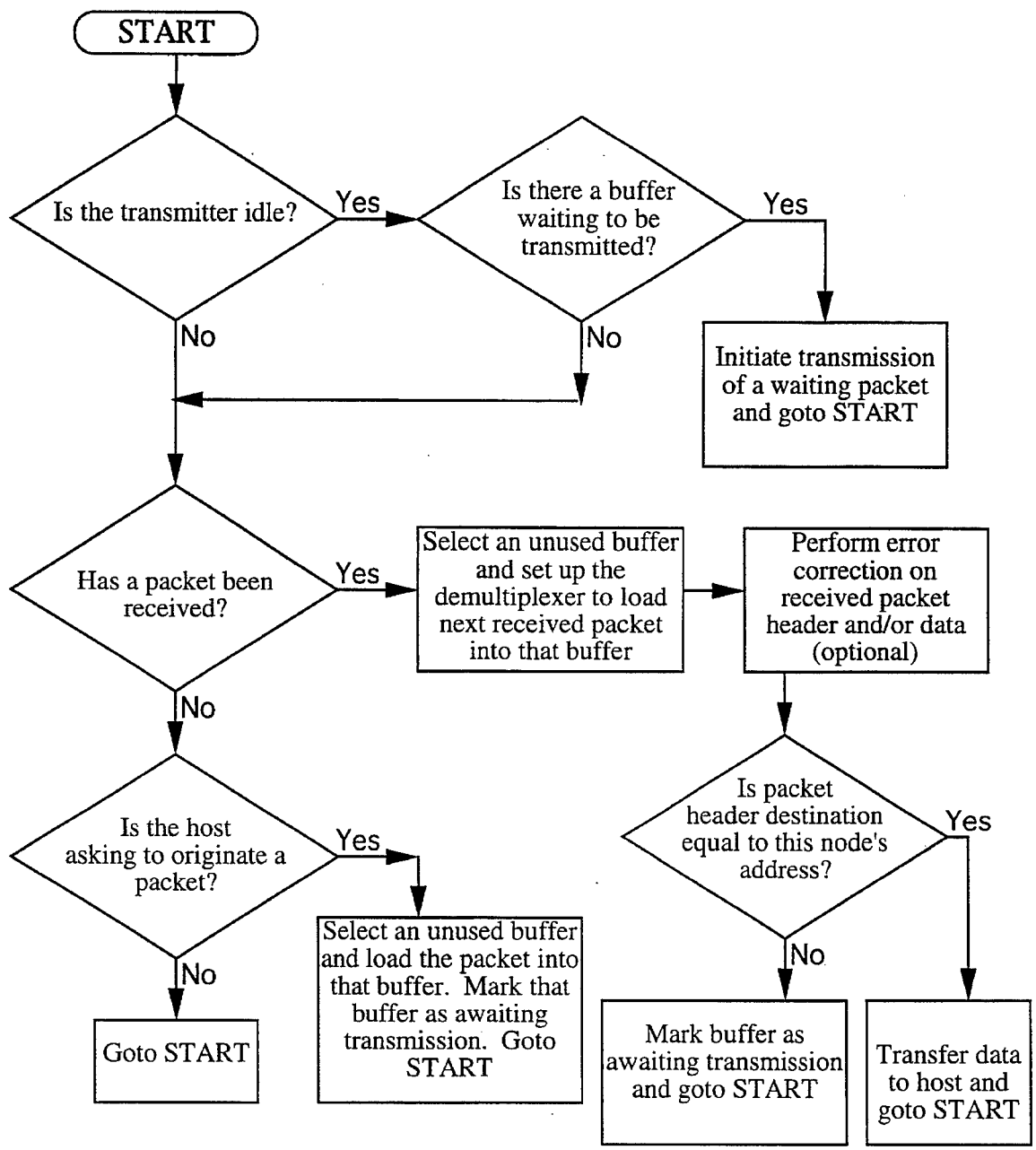
FIG. 5 shows an implementation of a software control algorithm for a node.

All these operations are accomplished in a similar manner, illustrated by a flow diagram in FIG. 5, in relation to FIG. 1. Whenever a packet is received by a node, the control microprocessor does two things. First, it commands the demultiplexer on the serial input port 111 of the buffer array 110 to transfer the next received packet into an unused row 112 of the buffer array 110. This is so that any packet which is subsequently received will not overwrite the most recently received packet before it can be processed. Second, the processor examines the header of the packet it has just received. The headers can include the source address and destination address. The software includes means for comparing the received data package to a node address, means for causing the data packet to be selectively transmitted through the transmitter means, and means for causing the data packet to be selectively transferred to the host interface. If the packet is destined for some other node, the processor commands the buffer array 110 to output that row 112 through the buffer array serial output port 113. Otherwise, the data in the row is transferred to the computer host 142 through the host interface 141. Once a packet has been transferred or retransmitted as appropriate, the buffer row 112 of array 110 which it occupied is marked as unused and can be subsequently employed to receive a new packet.

When used in a loop topology, the microprocessor may perform a third operation: It examines the header to see if the packet originated at some other node. If the packet originated at the current node, that means it has circulated throughout the network without being received by any node. This usually indicates that some sort of error has occurred.

Originating packets is straightforward. The microprocessor 140 loads the data to be transmitted from the host 142 into an unused row 112 of the buffer array 110 and sends it out in the same manner as packets received from the network. Because an incoming packet can be loaded into a different row 112 at the same time that an outgoing packet is being transmitted, a node can originate a packet at any time. No global access control, as in a token ring of FDDI network, is required. The only caveat is that a node takes care not to originate so many packets in a row 112 that it runs out of empty buffers 112 to receive incoming packets.

Software Error Checking

Because of the large size of a packet, the microprocessor 140 typically has time to perform many more operations that this minimal set. In fact, depending on the implementation, there may be time to perform several hundred or even thousand operations per packet. The range of operations which may be performed using this available processing power is essentially unlimited. This is the source of the tremendous flexibility of the design. To add or modify features, the microprocessor 140 simply needs to be reprogrammed. There is contained in the software means for error checking the source address, distribution address and the remainder of the data in relation to each packet.

One of the most common uses to which this resource may be put is checking for and correcting transmission errors. Error detection and correction algorithms are well-known to those skilled in the art. It should be noted that there are two different loci for errors in the transmitted data: the header, and the actual data. Errors in the header are usually more critical than errors in the actual data, since applications may not be sensitive to errors, or may do error correction on their own. Because error detection and correction is done in software, it is a trivial matter to do error detection and correction only on the packet header, or the entire packet as needed.

Resource Allocation

Because packets are of fixed length, one of the degrees of freedom which usually makes network resource allocation complicated has been eliminated. Thus, resource allocation is simplified. One application of this feature is in the allocation of real-time communications channels, such as would be needed for real-time video or voice communications. This is accomplished by using a connection-oriented network protocol, and reserving in advance every nth packet to carry real-time data.

Another application is in distributed network access control. At any time, a node can choose to transmit a data packet originating at that node rather than transmitting a packet originated at another node which is passing through. Each node can make this decision locally, with no need for any global access control.

Many other forms of the invention are possible, each differing from the other in matters of detail only. For instance, the microprocessor can be fabricated as a customized VLSI ship incorporating the associated control program. The invention is directed to the application.

The invention is to be determined solely in terms of the following claims.

I claim:

1. A node of a communications network for transporting packets of digital data wherein said packets include a header portion containing data for controlling the transmission of packets through the network, and a payload portion containing data to be transported, said packets being of a predetermined fixed size, the size being no less than 512 bytes, said node comprising:

(a) buffer means comprising a plurality of memory buffers, each said memory buffer being of sufficient size to contain a packet in its entirety, (b) transmitter means capable of transmitting in its entirety a packet contained in any one of said plurality of memory buffers onto a first unidirectional transmission medium, (c) receiver means capable of receiving a packet from a second unidirectional transmission medium and storing said packet in its entirety into any one of said plurality of memory buffers, and (d) processing means electrically connected to said memory buffers, said transmitter means, and said receiver means, said processing means being for:

i) controlling the selection of memory buffers from which packets are transmitted by said transmitter means, ii) controlling the selection of memory buffers into which packets are stored by said receiver means, and
iii) accessing data contained in said memory buffers.

2. A node according to claim 1 including a host computer interface enabling the transfer of data between the node and a host computer connected to said interface.

3. A node according to claim 1 wherein said memory buffer means includes at least one multiport random access memory having at least three ports.

4. A node according to claim 1 wherein the size of a packet is sufficiently large that a maximal-length standard Ethernet packet may be entirely contained in the packet payload.

5. A node according to claim 1 wherein the size of a packet is an integral power of 2.

6. A node according to claim 1 wherein the size of a packet is 2048 bytes.

7. A node according to claim 1 wherein said processing means includes means for managing the memory buffers to minimize the impact of packets lost as a result of there being insufficient memory buffers for storing all incoming packets.

8. A node according to claim 1 wherein said processing means includes means for determining when a packet has existed beyond a predetermined time and means for discarding such a packet.

9. A node according to claim 1 including at least one additional transmitter means.

10. A switch consisting of a node according to claim 9 wherein at least two of the transmitter means are connected to the memory buffers through a switching means, said switching means being controlled by the processing means.

11. A switch according to claim 10 wherein said switching means is a crossbar switch.

12. A communications network for packets of digital data comprising a plurality of nodes according to any one of claims 1 or 9 connected together by a plurality of unidirectional transmission media, each unidirectional transmission medium connecting exactly one transmitter means of a first node to exactly one receiver means of a second node, said first and second nodes possibly being the same node.

13. A communications network according to claim 12 comprising a number of nodes arranged as a ring wherein a transmitter means of a first node is connected through a first unidirectional transmission medium to a receiver means of a second node, a transmitter means of said second node is connected through a second unidirectional transmission medium to a receiver means of a third node, and so on until the transmitter means of a final node is connected through a final unidirectional transmission medium to the receiver means of said first node.

14. A communications network comprising a plurality of ring-type networks according to claim 13 connected by at least one switch.

15. A communications network according to claim 14 wherein at least one of the ring-type networks is connected to exactly one switch.

16. A communications network according to claim 15 wherein at least one of the ring-type networks consists of exactly one node connected to exactly one switch through exactly one pair of unidirectional transmission media.

17. A communications network according to claim 12 wherein a pair of the unidirectional transmission media are combined into a bidirectional transmission medium which simultaneously connects the transmitter means of a first node to the receiver means of a second node and the transmitter means of said second node to the receiver means of said first node.

18. A communications network according to claim 12 including at least one external network interface means for enabling the transfer of data between said communications network and a second communications network of a type different from said communications network.

19. A node according to claim 1 further including software means for controlling the operation of said processing means.

20. A method of designing a communications network for transporting packets of digital data wherein said packets include a header portion containing data for controlling the transmission of packets through the network, and a payload portion containing data to be transported, said method comprising the steps of:

(a) selecting a fixed size for the packets of data, said size being no less than 512 bytes, and then (b) designing a buffer means comprising a plurality of memory buffers, each said memory buffer being of sufficient size to contain a packet in its entirety, (c) designing a transmitter means capable of transmitting in its entirety a packet contained in any one of said plurality of memory buffers onto a first unidirectional transmission medium, (d) designing a receiver means capable of receiving a packet from a second unidirectional transmission medium and storing said packet in its entirety into any one of said plurality of memory buffers, (e) designing a processing means for:
 i) controlling the selection of memory buffers from which packets are transmitted by said transmitter means,
 ii) controlling the selection of memory buffers into which packets are stored by said receiver means, and
 iii) accessing data contained in said memory buffers, and (f) a step selected from the group consisting of:
 i) fabricating a device according to the design produced in steps a, b, c, d and e;
 ii) causing fabrication of a device according to the design produced in steps a, b, c, d and e; or
 iii) communicating the design produced in steps a, b, c, d and e to enable fabrication of a device according to said design.

21. A method of making a communications network for transporting packets of digital data wherein said packets include a header portion containing data for controlling the transmission of packets through the network, and a payload portion containing data to be transported, said method comprising the steps of:

(a) selecting a fixed size for the packets of data, said size being no less than 512 bytes, and then (b) providing a buffer means comprising a plurality of memory buffers, each said memory buffer being of sufficient size to contain a packet in its entirety, (c) providing a transmitter means capable of transmitting in its entirety a packet contained in any one of said plurality of memory buffers onto a first unidirectional transmission medium, (d) providing a receiver means capable of receiving a packet from a second unidirectional transmission medium and storing said packet in its entirety into any one of said plurality of memory buffers, and (e) providing a processing means for:
 i) controlling the selection of memory buffers from which packets are transmitted by said transmitter means,
 ii) controlling the selection of memory buffers into which packets are stored by said receiver means, and
 iii) accessing data contained in said memory buffers.

* * * * *